US010696436B2

(12) United States Patent
Ragsdale

(10) Patent No.: US 10,696,436 B2
(45) Date of Patent: Jun. 30, 2020

(54) SYSTEM FOR MANAGEMENT OF AUTOMATED STRETCH WRAPPING

(71) Applicant: John Ragsdale, Ocala, FL (US)

(72) Inventor: John Ragsdale, Ocala, FL (US)

(*) Notice: Subject to any disclaimer, the term of this patent is extended or adjusted under 35 U.S.C. 154(b) by 333 days.

(21) Appl. No.: 15/917,592

(22) Filed: Mar. 10, 2018

(65) Prior Publication Data
US 2018/0257799 A1 Sep. 13, 2018

Related U.S. Application Data

(63) Continuation of application No. 62/470,833, filed on Mar. 13, 2017.

(51) Int. Cl.
| | |
|---|---|
| *B65B 41/10* | (2006.01) |
| *G01B 11/02* | (2006.01) |
| *B65B 57/18* | (2006.01) |
| *B65B 11/04* | (2006.01) |
| *B65B 57/12* | (2006.01) |
| *G01B 21/32* | (2006.01) |
| *B65B 11/02* | (2006.01) |
| *G01B 11/16* | (2006.01) |
| *B65B 41/16* | (2006.01) |
| *B65B 11/00* | (2006.01) |

(52) U.S. Cl.
CPC ............ *B65B 41/10* (2013.01); *B65B 11/025* (2013.01); *B65B 11/045* (2013.01); *B65B 41/16* (2013.01); *B65B 57/12* (2013.01); *B65B 57/18* (2013.01); *G01B 11/02* (2013.01); *G01B 11/16* (2013.01); *G01B 21/32* (2013.01); *B65B 2011/002* (2013.01)

(58) Field of Classification Search
CPC ........ B65B 11/045; B65B 41/12; B65B 57/04
See application file for complete search history.

(56) References Cited

U.S. PATENT DOCUMENTS

| | | | | |
|---|---|---|---|---|
| 6,044,615 A | * | 4/2000 | Fukuda | ................... B65B 41/16 53/64 |
| 8,001,745 B2 | | 8/2011 | Carter et al. | |
| 9,896,229 B1 | * | 2/2018 | Pierson | ................. B65B 11/045 |
| 2008/0277570 A1 | * | 11/2008 | Saint Clair | ........ G01D 5/34776 250/231.18 |
| 2014/0223863 A1 | * | 8/2014 | Lancaster | ............... B65B 57/04 53/436 |
| 2015/0075120 A1 | * | 3/2015 | Schablin | ................. B65B 57/02 53/556 |
| 2015/0273767 A1 | * | 10/2015 | Batchelder | ........... G03G 15/224 264/401 |

(Continued)

*Primary Examiner* — Mohammad K Islam
(74) *Attorney, Agent, or Firm* — Mitchell J. Mehlman, Esq.

(57) ABSTRACT

Devices and method for accurately measuring the length of film feeding into a pre-stretch carriage from a supply roll and the length of film exiting after the pre-stretch carriage in order to accurately determine the actual percentage of film stretch occurring during the wrap cycle are provided. A first idler roller mounted on the frame of a pre-stretch carriage before the pre-stretching rollers and second idler roller mounted to the frame after the pre-stretching rollers are included. Optical rotary encoders are driven directly by idler roller shafts as stretch film passes around the shafts during film application. Systems including internet of things (IIOT) devices can be fitted or retro fitted to a wide variety of stretch wrapping machines.

14 Claims, 5 Drawing Sheets

(56) References Cited

U.S. PATENT DOCUMENTS

2016/0052208 A1\* 2/2016 Debora ................ B29C 64/209
                                                           264/40.1
2016/0339646 A1\* 11/2016 Baecker ................ B29C 64/147
2017/0101205 A1\* 4/2017 Schieck ................ B65B 57/04

\* cited by examiner

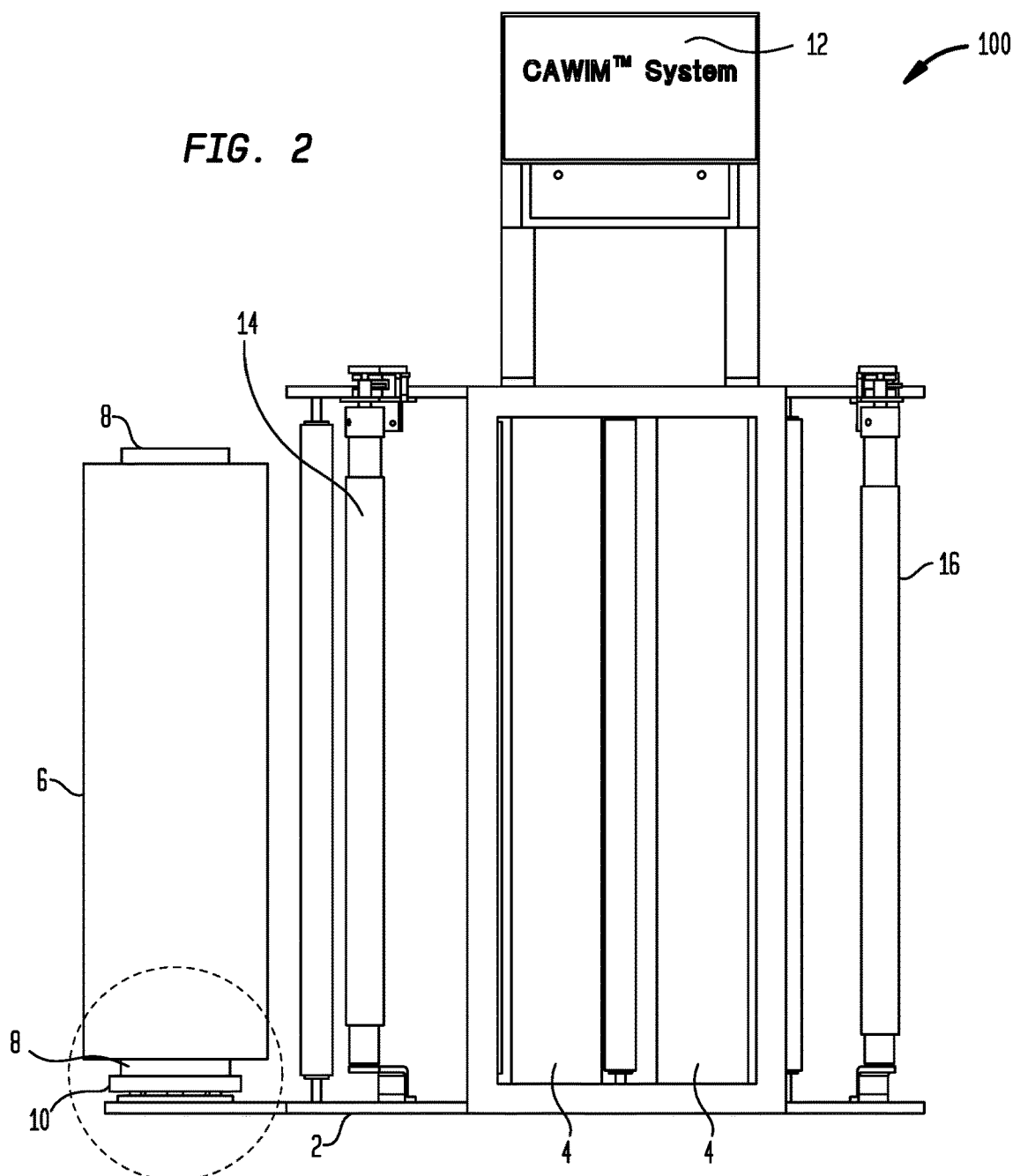
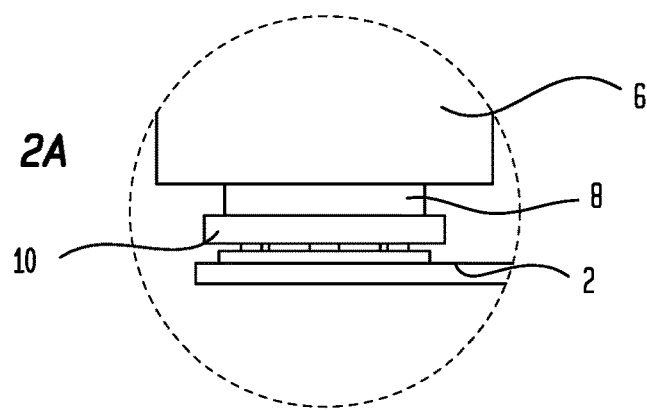

SYSTEM FOR MANAGEMENT OF AUTOMATED STRETCH WRAPPING

CROSS-REFERENCE TO RELATED APPLICATION

This application claims priority of U.S. Provisional Application Ser. No. 62/470,833 entitled "Systems for Management of Automated Packaging Operations", filed Mar. 13, 2017, the disclosure of which is incorporated herein by reference in its entirety.

FIELD OF THE INVENTION

Aspects of the disclosed subject matter include methods and systems for measuring critical parameters and providing the user with accurate, real time efficiency data for automated pallet wrapping operations.

BACKGROUND

Packaging is the technology of enclosing or protecting products for distribution, storage, sale, and use. Packaging also refers to the process of designing, evaluating, and producing packages. Packaging can be described as a coordinated system of preparing goods for transport, warehousing, logistics, sale, and end use. Packaging contains, protects, preserves, transports, informs, and sells.

Stretch wrap or stretch film is a highly stretchable plastic film that is wrapped around items. The elastic recovery keeps the items tightly bound. In contrast, shrink wrap is applied loosely around an item and shrinks tightly with heat. It is frequently used to unitize pallet loads but also may be used for bundling smaller items. The process provides a film around one or more products with the aim to stabilize protect and secure the cargo from tampering or theft.

Types of stretch film include bundling stretch film, hand stretch film, extended core stretch film, machine stretch film and static dissipative film. The most common stretch wrap material linear low-density polyethylene or LLDPE, which is produced by copolymerization of ethylene with alpha-olefins, the most common of which are butene, hexene and octene. The use of higher alpha-olefins (hexene or octene) gives rise to enhanced stretch film characteristics, particularly in respect of elongation at break and puncture resistance. Other types of polyethylene and PVC can also be used. Many films have about 500% stretch at break but are only stretched to about 100-300% in use. Once stretched, the elastic recovery is used to keep the load tight. Other properties such as break strength, cling, clarity, tear resistance, static discharge, etc. are also important.

In pallet unitizing, stretch wrap can have several functions including improved stability of products or packages, forming a unit load, more efficient handling and storage of unit loads, dust and moisture protection, tamper resistance and resistance to package pilferage, sun protection (UV stretch wraps). Ensuring cartons stay on the pallet is an important consideration in warehouse distribution, especially as the demands for increased throughput continues to rise.

There are two main methods of the pallet wrapping process; the vertical and the horizontal. The highly stretchable film is wrapped around the item while adjusting the tension, the film provides secondary protection. Other products which can't resist the tension of the film can, in principle, be damaged. It is thus important that the product packaging is stabilized and maintained before and during the wrapping process.

Categories and sub-categories of stretch wrappers include manual, semi-automatic and automatic wrappers.

Automatic wrappers can include a conveyor system to automatically load the wrapping machine and automatic systems to apply, seal, and cut the film. Types of automatic wrappers include:

Turntable wrappers; the load to be wrapped sits on a turntable which spins the load relative to the film roll, which is housed in a carriage which can move up and down a fixed "mast". Stretch is achieved by rotating the load at a faster rate than the film is fed.

Rotary arm wrappers; the load remains still while a rotating arm turns around it wrapping the load. This system is used for light loads or for speeds which would otherwise cause the load to topple due to high rotation speeds.

Rotary ring wrappers; the film is housed in a carriage on a horizontal ring in which the load remains static while the horizontal ring is rotating around the load and moves up and down vertically relative to the load, similar to a rotary arm stretch wrapper. The rotary ring technology can be a more balanced system with less wear and maintenance than the other available wrapping technologies. These wrappers are capable to reach the highest production capacities (up to 160 pallets/hour).

Calculation of pallet wrapping cost is critical to any manufacturing operation using any type of wrapper. Wrapping costs can be in the millions of dollars per year, thus cost and efficiency are essential parameters for management of business operations.

Typically, calculation of wrapping costs is a laborious, inefficient, and time-consuming operation. For example, a user might normally wrap a pallet, remove the film, wad it in a ball and weight it. Next, the user would calculate the number of pounds of material on each roll of stretch wrap film by using an industry standard formula for e.g. a roll with a 3" core. After converting the number of pounds to ounces, the user calculates the number of wrapped pallets per roll of film. Finally, the cost to wrap one pallet is calculated by dividing the cost per roll by the number of wrapped pallets per roll. This manual method is time consuming, inaccurate, and does not provide real time data to a user.

There are limited ways to determine the amount of film being used by a stretch wrapping machine. After a machine is adjusted, the adjustments can change. When an owner of a stretch wrapping machine sets up the machine, they expect the film costs to remain constant and expect the stability of the palletized loads to remain constant as well. In reality, machine wear or unauthorized adjustments made by personnel can alter machine function. Typically, the loads may appear to become less stable and the operators may adjust the machine to apply more film to the loads. In turn, this action can increase film costs as well as increase the amount of waste.

Weight differences between measured roll weights are used in part to calculate the cost per load wrapped. The purpose of utilizing this method for determining the cost per load is based on the currently acceptable load costing method used industry wide called "cut and weigh".

Thus, a need exists to better measure, monitor, and control the use of stretch film to provide users with accurate real time data. While known systems can perform a film weight test after every load is wrapped, the novel systems disclosed herein can provide real time data to using a machine to machine network or the internet. More accurate information about the consistency of the stretch wrapping process can be available to customers immediately and can include alarms when the process parameters are outside of a user specified range.

SUMMARY OF THE INVENTION

In one non-limiting aspect of the present invention a system for management of automated stretch wrapping operations can include an infeed idler roller assembly. The infeed idler roller assembly can have a first absolute optical rotary encoder for determining a first film length. The infeed idler roller assembly can be mounted prior to a pre-stretch roller of a stretch wrapping machine. An outfeed idler roller assembly can include a second absolute optical rotary encoder for determining a second film length. The outfeed idler roller assembly can be mounted after a pre-stretch carriage of the stretch wrapping machine. A controller can include a first processor for receiving the first film length from the first absolute optical rotary encoder and the second film length from the second absolute optical rotary encoder. A multifunctional interactive wireless device can include a second processor for executing an application. The second processor can be configured to communicate wirelessly with a cloud-based server.

In one embodiment, the system can include a load cell. The load cell can be mounted to a film supply roller and can be capable of sending a signal to the controller. The controller can convert the signal to a supply roll weight.

In some embodiments, the application can calculate and display an annual cost, a calculated pre-stretch percentage, and a cost per load.

In certain embodiments, application can generate an alarm when the calculated pre-stretch percentage falls below a user defined minimum pre-stretch percentage.

In other embodiments, the application can generate an alarm when the supply roll weight falls below a user defined minimum supply roll weight.

In yet other embodiments, the alarm is sent to a user's smart device via text message or email.

In another aspect, a method for management of automated stretch wrapping operations includes the steps of: measuring a first film length using a first absolute optical rotary encoder; measuring a second film length using a second absolute optical rotary encoder; transmitting the first film length and the second film length from a programmable logic controller to a cloud-based server; combining a user data set with the first and second film lengths; calculating a pre-stretch percentage based on the first film length and the second film length; and transmitting the pre-stretch percentage to an application residing on a multifunctional interactive wireless device.

In some embodiments, the user data set can include a price per roll, a roll length, a number of days per year, and a minimum pre-stretch percentage.

In certain embodiments the method can include the step of generating an alarm. The alarm can be sent to the application on the multifunctional interactive wireless device.

In some embodiments, the alarm can include a low pre-stretch warning when a measured pre-stretch percentage falls below a user specified pre-stretch percentage.

In particular embodiments, the alarm can include a low roll weight warning when a measured roll weight falls below a user specified roll weight.

In another aspect of the present invention, a device can include a stretch carriage assembly of an existing stretch wrapping machine. A supply film roll can be mounted to said stretch carriage assembly on a roller. The roller can include a load cell mounted thereto for obtaining an accurate weight of the supply film roll. An infeed roller assembly can be mounted to the stretch carriage assembly prior to a pre-stretch roller. An outfeed roller assembly can be mounted to the stretch carriage assembly after the pre-stretch roller. A first optical encoder can be configured to determine the number of rotations of the infeed roller assembly. A second optical encoder can be configured to determine the number of rotations of the outfeed roller assembly; a controller can be configured to send and receive signals from the load cell, the first optical encoder, the second optical encoder, and a cloud-based server.

In some embodiments the device can further include a smart device running an application capable of communicating with the cloud-based server.

In some embodiments, the infeed roller assembly can include a roller tube mounted on a rod. The rod can have a protruding shaft for driving the first optical encoder thereby causing the first optical encoder to determine the number of rotations of the rod and to send a signal to the controller for determining a corresponding length of film running over the infeed roller assembly.

In some embodiments, the first optical rotary can be mounted to a first shaft and can be configured to pulse about 360 times per rotation of the first shaft thereby providing a first shaft rotation accuracy of about 1 degree and a first corresponding film length.

In certain embodiments of the aspect, the outfeed roller assembly can include a roller tube mounted on a rod. The rod can have a protruding shaft for driving the second optical encoder thereby causing the second optical encoder to determine the number of rotations of the rod and to send a signal to the controller for determining a corresponding length of film running over the outfeed roller assembly.

In yet other embodiments, the infeed roller assembly can include a first roller tube mounted on a first rod. The first rod can have a first protruding shaft for driving the first optical encoder thereby causing the first optical encoder to determine the number of rotations of the rod and to send a first signal to the controller for determining a first corresponding length of film running over the infeed roller assembly. An outfeed roller assembly can include a second roller tube mounted on a second rod. The second rod can have a second protruding shaft for driving the second optical encoder thereby causing the second optical encoder to determine the number of rotations of the second rod and to send a second signal to the controller for determining a second corresponding length of film running over the outfeed roller assembly.

In some embodiments the protruding shaft can include a pin mounted substantially perpendicular to the shaft.

In other embodiments, the first protruding shaft can include a first pin mounted substantially perpendicular to the first protruding shaft and the second protruding shaft can include a second pin mounted substantially perpendicular to the second protruding shaft.

In some embodiments of this aspect, the device can further include a multifunctional interactive wireless device (MIWD). The MIWD can include a processor for executing an application. The processor can be configured to communicate wirelessly with the cloud-based server. The application can display an annual cost, a calculated pre-stretch percentage, a cost per load, a low supply roll alarm, and a low pre-stretch alarm.

BRIEF DESCRIPTION OF THE DRAWINGS

FIG. 2 is a front view of some of the elements of the system of FIG. 1.

FIG. 2A is a detail view of the load cell film roller assembly of the system of FIG. 1.

DESCRIPTION

Figure 1:
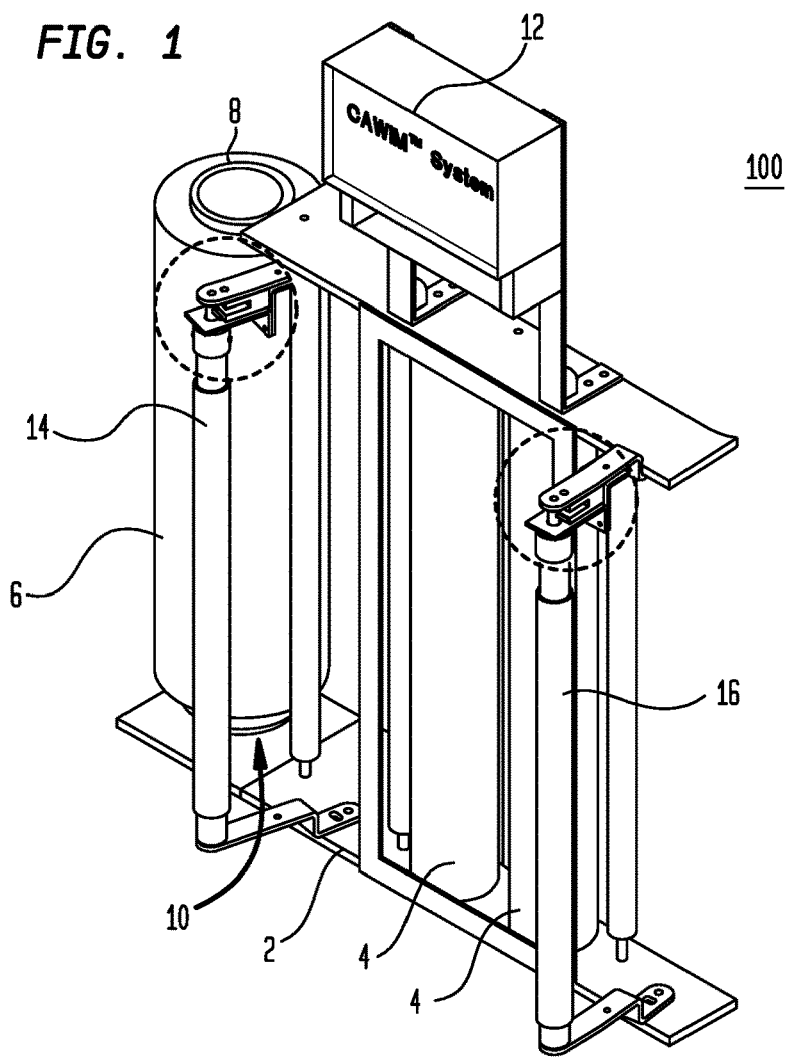
FIG. 1 is an isometric view of the system according to one non-limiting embodiment of the present invention.

The present invention provides automated devices, methods, and systems for determining the pre-stretch rate, cost per load, annual cost, and other desirable data based on a flexible reconfigurable system. The system includes devices and systems for determining a pre-stretch rate that can be based on multiple optical encoders mounted to idler rollers before and after the pre-stretch carriage of an automated stretch wrapping machine. The user can input data to customize the system for each operation or new material.

The instant invention can be mounted on any pre-existing machine, by retrofit, or be adapted to new machines at the factory. It is particularly valuable to a user to retrofit an existing machine to improve efficiency of any make or model to more accurately measure stretch film usage, machine carriage pre-stretch efficiency, carriage cycles per day, total carriage cycles, and projected packaging costs.

The device, system or method can measure both length of film feeding into the pre-stretch carriage from the supply roll and the length of film exiting after the pre-stretch carriage in order to accurately determine the actual amount of film stretch occurring during the wrap cycle. This measurement can be accomplished by using a first low tack rubber coated idler roller mounted on the frame of the pre-stretch carriage before the pre-stretching stretching rollers and second low tack rubber coated idler roller mounted to the frame after the pre-stretching rollers. At the end of each idler roller is an optical rotary encoder that is driven by the idler roller shaft as the film passes around it during film application. This method allows for highly accurate measurement of the exact length of film passing through the carriage during film application to the load.

The system can include a machine to machine network that communicates with an application which is executed on a processor, such as a processor within a smart phone, tablet, lap top, or desk top computer and can communicate with a dedicated, secure cloud server. The system can be an internet of things (IIOT) device which can be fitted or retro fitted to a variety of stretch wrapping machines.

As used herein, a multifunctional interactive wireless device (MIWD) includes a smart phone, tablet, or any device that can utilize Wi-Fi or cell data to communicate with a remove server.

As used herein an instant message can be a text message, an email, a voicemail or any type of electronic alert sent to an MIWD.

There exists a need to accurately measure the actual amount of stretch film applied during a wrap cycle by the weight of the applied film in order to accurately determine the cost of stretch film applied during that wrap cycle.

In one non-limiting embodiment of the invention, system 100 includes a supply roll of stretch film can be weighed before and after a machine cycle by means of a flat load cell arrangement mounted directly under the supply roll of film. The load cell/scale can utilize four independent load cells in a Wheatstone bridge electrical configuration. Other load cell arrangements or known methods for accurately determining weight are contemplated herein.

Referring to FIGS. 1-2, the system 100 includes stretch carriage assembly 2 of an existing stretch wrapping machine which includes stretch rollers 4. Supply film roll 6 is mounted to the carriage assembly on a roller 8 that includes a load cell 10 for obtaining an accurate weight of the film roll. The load cell data is sent to controller 12 which can be mounted to the carriage.

Next, the infeed and outfeed idler roller assemblies 14, 16 are installed on a preexisting machine carriage assembly or they can be included on the carriage assembly of a new machine before and after the pre-stretch rollers respectively. It should be appreciated that both infeed and outfeed idler roller assemblies are required in addition to existing pre-stretch rollers. As such, the idler roller assemblies do not operate as pre-stretch rollers and need not be motorized.

Figure 1A:
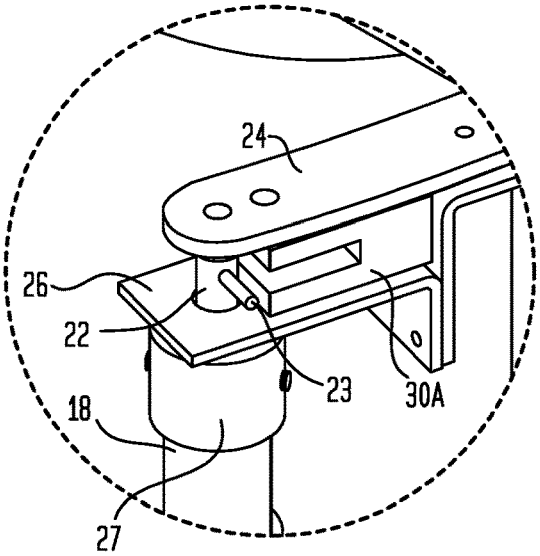
FIGS. 1A and 1B are isometric detail views of the input and output roller assemblies depicting some of the elements of the system of FIG. 1.
Figure 1B:
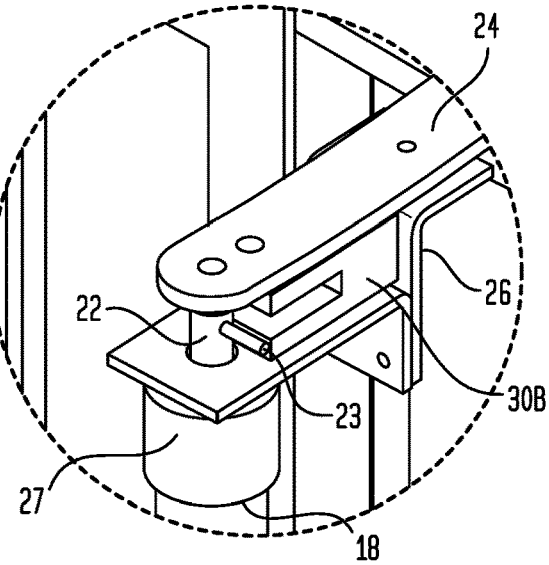
Figure 3:
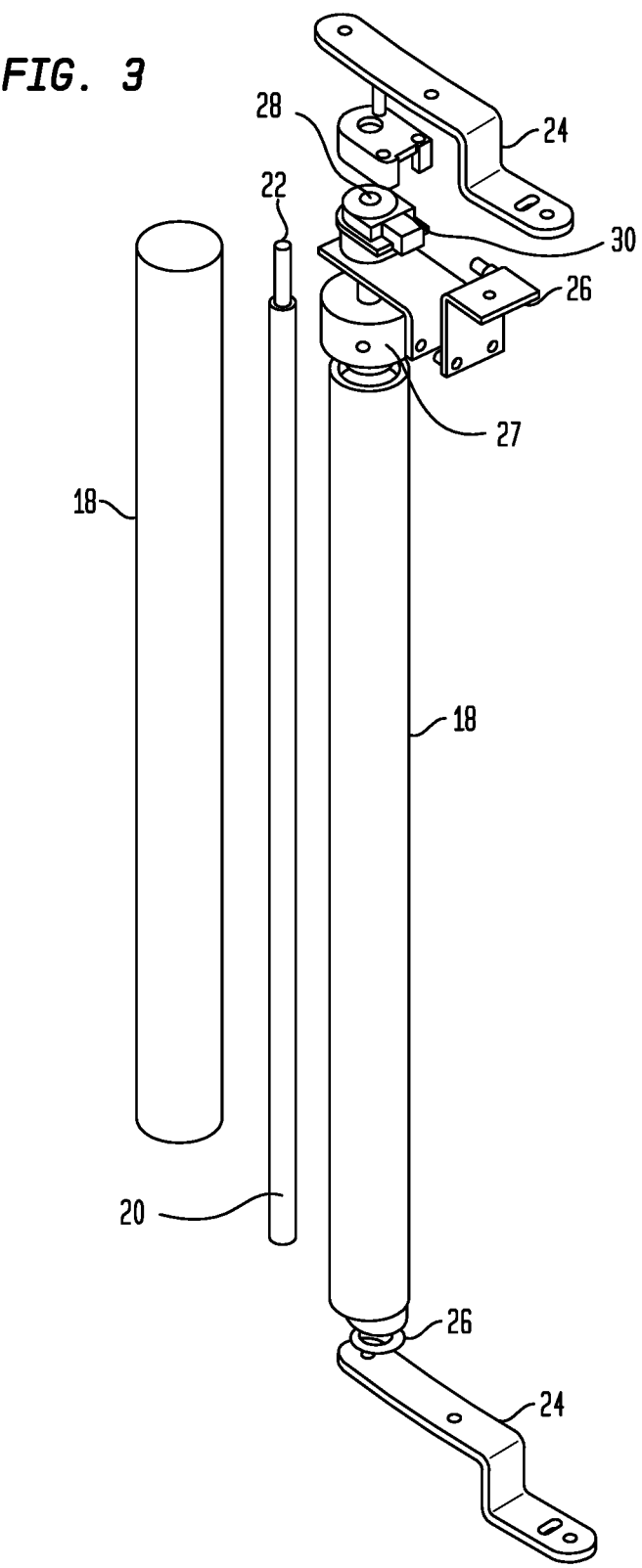
FIG. 3 is an exploded isometric view of the roller assembly of the system of FIG. 1.

As shown particularly in FIGS. 1A, 1B and 3, the roller assemblies, 14, 16 include roller tube 18 mounted on rod 20 that includes protruding shaft 22, mounting brackets, and bearings to allow for free rotation. The shaft 22 can include pin 23. When The roller can include a rubber coating to eliminate inaccuracy due to slippage of the film on the roller surface.

Encoder mounting brackets 26, 27 are attached to the assembly such that the rod protrudes into aperture 28 of digital optical encoder 30A (infeed) and 30B (outfeed). When the shaft and rod rotate, the pin can pass near the encoder. The encoder can determine the number of rotations of the rod and send a signal to the controller for determining a corresponding length of film running over the roller that has been dispensed. Other methods of encoder coupling are contemplated, for example, a direct frictional or interference connection between the shafts and the encoders. In some embodiments, the optical encoders can be configured to pulse about 360 times per each complete rotation of the substantially circular shafts coupled to the encoders. This provides a high degree of accuracy because the shaft rotation, corresponding with a film length, can be determined to about 1 degree of shaft rotation.

Figure 4:
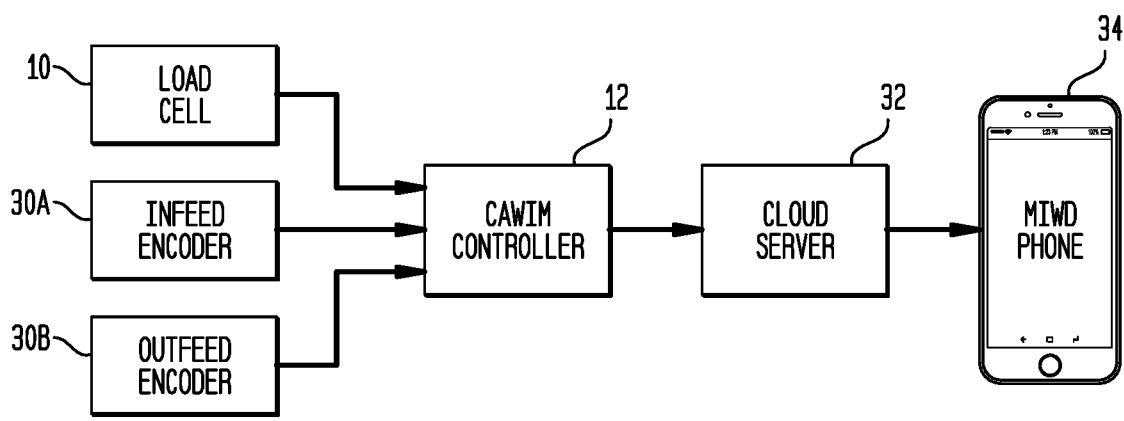
FIG. 4 is a system flow chart depicting some of the elements of the embodiment of FIG. 1.

As shown in FIG. 4, both infeed 30A and outfeed 30B encoders and the load cell 10 can send data signals to the system controller 12 for indicating the length of film after the stretching operation, or the weight of the film supply roll 6. The controller communicates with a cloud server 32. A MIWD such as a smart phone 34 can communicate with the server. In some embodiments, the film or roller measurement signals can be sent wirelessly, for example, by using Bluetooth protocol to a local device, such as a controller including a machine to machine network processor. The data can then be transmitted to or from a cloud server.

Figure 5:
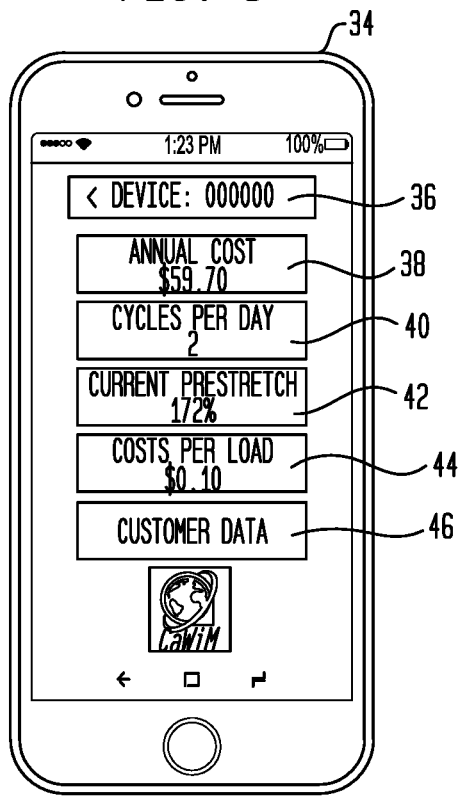
FIGS. 5, 5A and 5B show a front view of a multifunctional interactive wireless device depicting a results screen and a user input screen respectively.
Figure 5A:
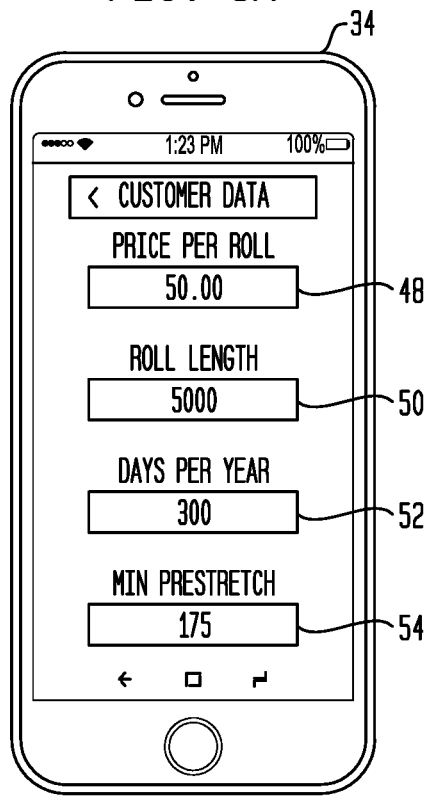
Figure 5B:
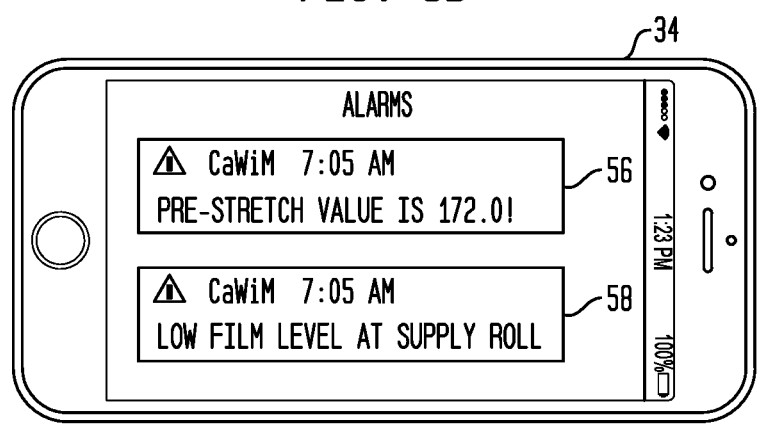

Referring to FIGS. 5, 5A, and 5B, the user can open an application residing and executed on a MIWD to log into the server to enter user specification data or review operations data.

Referring to FIG. 5, the smart phone application can display data for a particular device 36. Next as shown in box 38, annual cost can be displayed. The cycles per day 40 can be set by the user. For example, a day can be 8 hours and can be resettable using the cycles per day box as a button.

The actual pre-stretch % 42 and the cost per load 44 are calculated and displayed. The cost per load can be reset when the button is pressed. The value can be an average based on the total number of cycles.

A customer tab 46 allows for input of customer specific data for each run. FIG. 5A depicts the customer data screen. The customer may input the price per roll, roll length, days per year 52 and minimum pre-stretch 54 or minimum weight for the supply roll (not shown). The application can be reconfigured to meet any customer specific needs.

As shown in FIG. 5B, several alarm features can be included to warn the use of out of specification conditions. For example, if the pre-stretch % drops below a customer specified value, the system will generate an alarm 56 that is display on the application interface. This may include an audible or visual alarm sent to the resident smart phone or tablet. Likewise, based on the weight data from the load cell, an alarm 58 can be sent to alert the user of a low weight level at the supply roll. Both of these alarms can be critical in allowing the user to intervene to correct a problem, thus maximizing machine efficiency and minimizing downtime for optimal cost saving operations.

In some embodiments, the rollers can include counting cams. The cams can be attached to the end of the roller to determine the number of rotations. The cam rotation can be captured by a mechanical or digital sensor that converts analog rotation to a digital signal. The signal can be sent to the controller.

Calibration Example:

Once installed, the system can be calibrated to the actual carriage pre-stretch percentage. This calibration can be accomplished by marking the supply roll of film, for example with 1-foot incremental vertical lines spaced 1 foot apart. As the film is pulled around the infeed roller, the actual pulse count from the optical encoder is recorded for each 1-foot mark as it passes the infeed roller. The film is then pulled through the pre-stretch carriage and around the out-feed roller. The distance between the calibration marks to provide the actual pre-stretch amount. For example, 12" of film in vs. 36" of film out equals a 200% ((36−12)/12)×100) actual pre-stretch percentage. As the film is pulled out of the carriage and around the out-feed roller, the pulse count of the out feed optical encoder for the measured 36" is also recorded. The recorded pulse counts for in-feed and out-feed are added the controller program as calibrated actual pre-stretch data.

Next, the system load cell is calibrated by using the net weight of an empty film core and the net weight of a full roll of stretch film. During operation, and at the beginning of each stretch machine cycle, a data snapshot of the new film weight can be captured and sent from the load cell to the controller for use in future calculations. At the end of each machine cycle, a new data snapshot of the stretch film weight can be sent from the load cell to the controller.

At the end of each machine cycle, the controller can send all collected data to a folder in a cloud server or local server, via a wireless (for example, WIFI) connection. The data is then used to calculate the actual amount of film used during each cycle by weight and by length. A user can download an IOS or Android application to a MIWD. The user can log in using for example, a serial number of the installed system and a supplied password.

When the user logs in to the application, the user may enter customer specific data into the customer data interface screen. Customer data can include, for example, price per roll, roll length, days per year, or minimum pre-stretch as discussed above. Next the user can view the device data screen to see the results of the run. Results can include annual cost, cycles per day, current pre-stretch value, or cost per load as shown in FIG. 5.

EXAMPLE 1

Current industry methods used to determine cost per are inefficient and inaccurate. Typically, stretch film is sold by weight. For example, a standard 6,000 ft roll of 80 gauge stretch film will have a net roll weight of about 38 lbs. After a manufacturer has determined their best packaging method for shipping a 1,500 lb. pallet load of boxed product stacked 60" tall requires 3-top wraps and a 3-bottom wrap pattern with a 50% overlap of film at a 60% machine applied film tension.

After the load is wrapped, the user cuts the film off the wrapped load then weighs the film by means of a scale, resulting in a total of 12 oz of applied stretch film. A manual calculation for cost per load wrapped can be performed, for example 38.4 lb/roll×16 oz/lb=614.4 oz/roll of fill. At $45.00/roll÷614.4 oz/roll=0.07324 $/oz. Thus, 12 oz of applied film×0.07324=$0.8789 cost to stretch wrap the load.

Using the same criteria shown above for a best packaging method, $45.00 cost per roll÷6,000 ft/roll=$0.0075 cost per foot. After completing a wrap cycle the length in the first idler roller optical encoder measures 117.1866 feet fed into the carriage. Thus, 117.1866 feet of film used during cycle from supply roll×$0.0075 per foot of film=$0.8789 cost per load.

Stretch carriage percentage efficiency during application of the stretch film can be monitored by the system. The pulse count registered on the in-feed optical encoder that represents one foot of film is calibrated. This is accomplished by placing calibration marks at one (1) foot increments on the outside of the supply roll. As the marks pass around the in-feed idler roll the total pulse count that represents that one (1) foot of film is recorded in the PLC program. As the film carrying the calibration marks is pulled though the geared pre-stretch carriage under power the film is stretched. After pulling the film through the carriage new measurements are made between the marks.

Alarm Example:

One foot of film (distance between marks) is measured into the carriage and 3 feet between marks is measured after stretching, thus represents 200% pre-stretch. The 200% ratio is stored as current percentage of pre-stretch in the PLC. If during the cycle an out of specification pre-stretch percentage is detected, an alert is can be sent to the user as an instant message, email, text message or the like.

The system can record the total machine cycles per day to determine projected annual cost of packaging as the system operates. Further, instant message alerts can inform users that the machine is low on film by monitoring the load cell data from the supply roll through the smart device application. All user interface with the system is performed through the smart device application as an implemented IoT solution for stretch wrap packaging cost and efficiency control.

EXAMPLE 2

The "feet in" count is measure to be 65, the "feet out" count is measured to be 199. The processor can instantaneously and continuously calculate the % stretch (e.g. (199−65)/65)*100=206%). Pre-stretch % 42 can be reset to zero to keep a running value of % stretch.

Next, the cycles per day 40 can be set by the user. For example, a day can be 12 hours and can be resettable using the cycles per day box for 2 cycles per day.

The cost per load is calculated and displayed 44. The cost per load can be reset when the button is pressed. The value can be an average based on the total number of cycles.

Customer data 46 the customer to input customer specific data for each run. This box can include a button that opens a customer data screen (FIG. 5A) for input of data used in calculating cost per load 44 and annual cost 38.

The annual cost 38 based on the number of loads and cost per load 44 can be included. For example, 240 loads per day×300 days per year×cost per load=annual cost.

The user can input price per roll 48, roll length 50, and days per year 52 which are utilized for the calculations for cost per load 44. It should be recognized that the application can be reconfigured to meet any customer specific needs.

Although the invention has been described and illustrated with respect to exemplary embodiments thereof, it should be understood by those skilled in the art that the foregoing and various other changes, omissions and additions may be made therein and thereto, without parting from the spirit and scope of the present invention. Accordingly, other embodiments are within the scope of the following various embodiments.

What is claimed is:

1. A method for management of automated stretch wrapping operations comprising:
   a. measuring a first film length using a first absolute optical rotary encoder, said first absolute encoder being attached to an infeed roller assembly including a first roller tube mounted on a first rod, said first rod having a first protruding shaft for driving said first optical encoder thereby causing said first optical encoder to determine the number of rotations of said first rod and to send a signal to said controller for determining a first film length running over said infeed roller assembly;
   b. measuring a second film length using a second absolute optical rotary encoder, said second absolute encoder being attached to an outfeed roller assembly including a second roller tube mounted on a second rod, said second rod having a second protruding shaft for driving said second optical encoder thereby causing said second optical encoder to determine the number of rotations of said second rod and to send a signal to said controller for determining a second film length running over said outfeed roller assembly;
   c. transmitting said first film length and said second film length from a programmable logic controller to a cloud-based server;
   d. combining a user data set with said first film length and said second film length;
   e. calculating a pre-stretch percentage based on said first film length and said second film length; and
   f. transmitting said pre-stretch percentage to an application residing on a multifunctional interactive wireless device.

2. The method of claim 1, wherein said user data set includes a price per roll, a roll length, a number of days per year, and a minimum pre-stretch percentage.

3. The method of claim 1, further including the step of generating an alarm, said alarm being sent to said application on said multifunctional interactive wireless device.

4. The method of claim 3, wherein said alarm includes a low pre-stretch warning when a measured pre-stretch percentage falls below a user specified pre-stretch percentage.

5. The method of claim 3, wherein said alarm includes a low roll weight warning when a measured roll weight falls below a user specified roll weight.

6. A device comprising:
   a stretch carriage assembly of an existing stretch wrapping machine;
   a supply film roll being mounted to said stretch carriage assembly on a roller, said roller including a load cell mounted thereto for obtaining an accurate weight of said supply film roll;
   an infeed roller assembly, said infeed roller assembly being mounted to said stretch carriage assembly prior to a pre-stretch roller;
   an outfeed roller assembly, said outfeed roller assembly being mounted to said stretch carriage assembly after said pre-stretch roller;
   a first optical encoder configured to determine the number of rotations of said infeed roller assembly;
   a second optical encoder configured to determine the number of rotations of said outfeed roller assembly; and
   a controller, said controller being configured to send and receive signals from said load cell, said first optical encoder, said second optical encoder, and a cloud-based server,
   wherein said infeed roller assembly includes a first roller tube mounted on a first rod, said first rod having a first protruding shaft for driving said first optical encoder thereby causing said first optical encoder to determine the number of rotations of said first rod and to send a signal to said controller for determining a corresponding length of a film running over said infeed roller assembly.

7. The device of claim 6, further including a smart device running an application capable of communicating with said cloud-based server.

8. The device of claim 6, wherein said first absolute optical rotary encoder is mounted to a first shaft and is configured to pulse about 360 times per rotation of said first shaft thereby providing a first shaft rotation accuracy of 1 degree.

9. The device of claim 6, wherein said outfeed roller assembly includes a second roller tube mounted on a second rod, said second rod having a second protruding shaft for driving said second optical encoder thereby causing said second optical encoder to determine the number of rotations of said second rod and to send a signal to said controller for determining a corresponding length of the film running over said outfeed roller assembly.

10. A device comprising:
    a stretch carriage assembly of an existing stretch wrapping machine;
    a supply film roll being mounted to said stretch carriage assembly on a roller, said roller including a load cell mounted thereto for obtaining an accurate weight of said supply film roll;
    an infeed roller assembly, said infeed roller assembly being mounted to said stretch carriage assembly prior to a pre-stretch roller;
    an outfeed roller assembly, said outfeed roller assembly being mounted to said stretch carriage assembly after said pre-stretch roller;
    a first optical encoder configured to determine the number of rotations of said infeed roller assembly;
    a second optical encoder configured to determine the number of rotations of said outfeed roller assembly; and a controller, said controller being configured to send and receive signals from said load cell, said first optical encoder, said second optical encoder, and a cloud-based server, wherein said infeed roller assembly includes a first roller tube mounted on a first rod, said first rod having a first protruding shaft for driving said first optical encoder thereby causing said first optical encoder to determine the number of rotations of said rod and to send a signal to said controller for determining a first corresponding length of a film running over said infeed roller assembly, and said outfeed roller assembly includes a second roller tube mounted on a second rod, said second rod having a second protruding shaft for driving said second optical encoder thereby causing said second optical encoder to determine the number of rotations of said second rod and to send a signal to said controller for determining a second corresponding length of the film running over said outfeed roller assembly.

11. The device of claim 6, wherein said first protruding shaft includes a pin mounted substantially perpendicular to said first protruding shaft.

12. The device of claim 9, wherein said second protruding shaft includes a pin mounted perpendicular to said second protruding shaft.

13. The device of claim 10, wherein said first protruding shaft includes a first pin mounted perpendicular to said first protruding shaft and said second protruding shaft includes a second pin mounted perpendicular to said second protruding shaft.

14. The device of claim 6, further including a multifunctional interactive wireless device including a processor for executing an application, said processor being configured to communicate wirelessly with said cloud-based server, wherein said application displays an annual cost, a calculated pre-stretch percentage, a cost per load, a low supply roll alarm, and a low pre-stretch alarm.

* * * * *